Oct. 4, 1938.   A. C. FISCHER   2,132,152
APPARATUS FOR MAKING COMPOSITION STRIPS
Filed Feb. 19, 1930
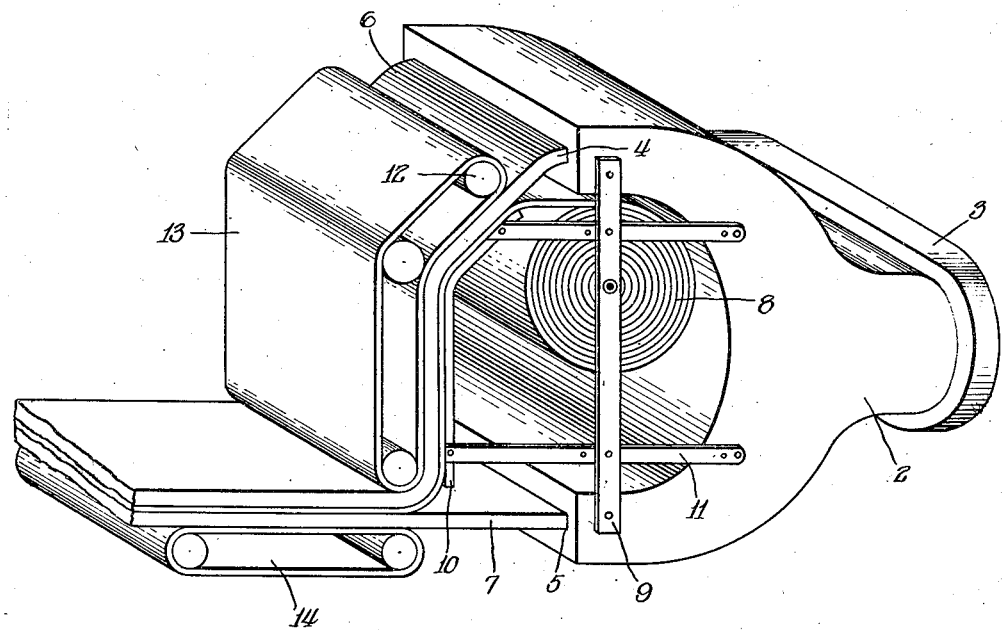
Inventor:—
Albert C. Fischer
By Albert F. Robinson
Atty.

Patented Oct. 4, 1938

2,132,152

UNITED STATES PATENT OFFICE 2,132,152

APPARATUS FOR MAKING COMPOSITION STRIPS

Albert C. Fischer, Chicago, Ill.

Application February 19, 1930, Serial No. 429,558

4 Claims. (Cl. 154—1)

This invention relates to the fabrication of composition constructional strips, and particularly pertains to a laminated structure including a flexible reenforcing foundation layer and a surface covering or coverings of elastic and compressible material.

One of the objects of the invention is to fabricate in a continuous layer operation a composition strip composed of a plurality of layers of compressible and elastic material, such as rubber or bituminous material, fed from an extrusion machine in contact with a reenforcing foundation layer, and compressed into a composite laminated structure. The compressible and elastic material is extruded in a warm plastic condition, thereby securely bonding with the foundation sheet which may advantageously be a waterproof sheet, such as saturated felt.

With the foregoing object in view and others to be mentioned hereafter, the invention consists in the novel and improved construction and arrangement of parts as described and claimed, and as illustrated in the accompanying drawing.

In the drawing the single figure is a perspective view of an apparatus embodying the present invention.

Referring now to the drawing for a more particular description the invention is typified by the manufacture of a composition strip, block or the like, which is adapted to be employed in the constructional material art, especially in building and paving for surfacing and for separating rigid elements.

Numeral 2 designates an extruder head or die which may be attached to the end of an extruder by means of flanged end 3. This die head is preferably steam heated for retaining the plastic material in a warm plastic condition, and also bifurcated to feed said plastic through openings 4 and 5 into separate layers 6 and 7.

Within a recess between the forked terminals of the extruder head, a roll 8 of felt, preferably saturated, may be supported and interposed between the plastic layers as they are fed through the device. Some such means as standard 9 may be attached to the head and employed to support the foundation roll.

The foundation sheet is preferably fed contiguous to the upper outlet of the extrusion head for receiving the plastic layer as it is projected. Means for effecting feeding of the foundation sheet at this point, is typified by a plate 10 supported from bar 11 which may advantageously be adjustably attached to standard 9 and the extrusion head. In order to press the plastic layer on the foundation, forming means in the nature of rolls 12 may be employed. These rolls, if desired, may be circumvolved with an endless belt 13.

The lower plastic layer is fed upon the extrusion head and applied to the under-surface of the foundation sheet between the first mentioned means, and a similar forming means 14. The composite sheet is compressed between the two forming devices, and then cut into strips.

Though I have described with particularity of detail a certain specific embodiment of the invention; yet it is not to be understood therefrom that the invention is restricted to the particular embodiment disclosed. Various modifications may be made by those skilled in the art without departing from the spirit of the invention.

I claim:

1. An apparatus for fabricating composition strips comprising an extrusion device including a head having a bore terminating in a plurality of outlets through which layers of plastic material are fed, a plate contiguous to one of the outlets over which a foundation layer is fed in juxtaposition with one of the plastic layers, and forming means for compressing the composite strip.

2. An apparatus for fabricating composition strips comprising an extrusion device including a head having a bore terminating in a plurality of outlets through which layers of plastic material are fed, an adjustable plate contiguous to one of the outlets over which a foundation layer is fed in juxtaposition with one of the plastic layers, and revolving means for compressing the composite strip.

3. An apparatus for fabricating composition strips comprising an extrusion device including a head having a bore terminating in a plurality of outlets through which layers of mastic material are fed, a plate extending between the outlets over which a foundation layer is adapted to be fed, and forming means for compressing the composite strip.

4. An apparatus for fabricating composition strips comprising an extrusion device including a head having a bore terminating in a plurality of outlets through which layers of plastic material are fed, means for carrying one of said layers in a natural direction from its outlet, a plate contiguous to the other one of the outlets over which a foundation layer is fed in juxtaposition with one of the plastic layers, said plate being bent and extending toward said first specified layer to carry the other layer thereto, and means for compressing the composite strip.

ALBERT C. FISCHER.